United States Patent [19]

Givens

[11] Patent Number: 4,752,882

[45] Date of Patent: Jun. 21, 1988

[54] METHOD FOR DETERMINING THE EFFECTIVE WATER SATURATION IN A LOW-RESISTIVITY HYDROCARBON-BEARING ROCK FORMATION BASED UPON ROCK MATRIX CONDUCTANCE

[75] Inventor: Wyatt W. Givens, Dallas, Tex.

[73] Assignee: Mobil Oil Corporation, New York, N.Y.

[21] Appl. No.: 859,520

[22] Filed: May 5, 1986

[51] Int. Cl.[4] .............................................. G01V 3/00
[52] U.S. Cl. ...................................... 364/422; 73/152; 324/376
[58] Field of Search ........................ 73/152; 364/422; 324/338, 339, 376

[56] References Cited

U.S. PATENT DOCUMENTS

| | | | |
|---|---|---|---|
| 4,233,839 | 11/1980 | Coates | 73/152 |
| 4,369,497 | 1/1983 | Poupon | 364/422 |
| 4,397,181 | 8/1983 | Caldwell | 73/152 |
| 4,429,221 | 1/1984 | Allen | 250/256 |
| 4,435,977 | 3/1984 | Gournay | 73/152 |
| 4,506,548 | 3/1985 | Zemanek, Jr. | 73/152 |
| 4,517,836 | 5/1985 | Lyle, Jr. | 73/152 |
| 4,622,849 | 11/1986 | Fertl | 73/152 |
| 4,626,773 | 12/1986 | Kroeger et al. | 324/376 X |
| 4,631,677 | 12/1986 | Park et al. | 324/376 X |

OTHER PUBLICATIONS

Bussian, A. E. "Electrical Conductance in a Porous Medium", *Geophysics*, vol. 48, No. 9, Sep. 1983, 1258-68.

*Primary Examiner*—Jerry Smith
*Assistant Examiner*—Clark A. Jablon
*Attorney, Agent, or Firm*—Alexander J. McKillop; Michael G. Gilman; George W. Hager, Jr.

[57] ABSTRACT

A low-resistivity, hydrocarbon-bearing subsurface sand formation is logged with an electric logging system. Measurements are taken of formation porosity, water resistivity and formation resistivity. Core samples are taken from the formation water and electrical measurements are made on such core samples that reflect both a free-fluid pore network conductance and a rock matrix conductance. From the measurements, a formation water saturation corrected for rock matrix conductance is determined.

4 Claims, 14 Drawing Sheets

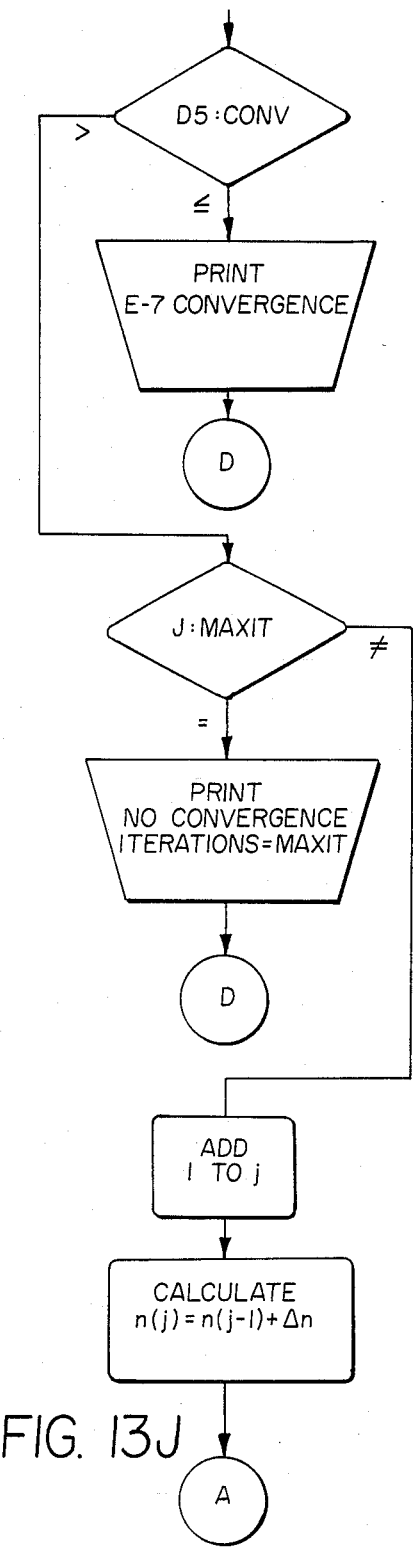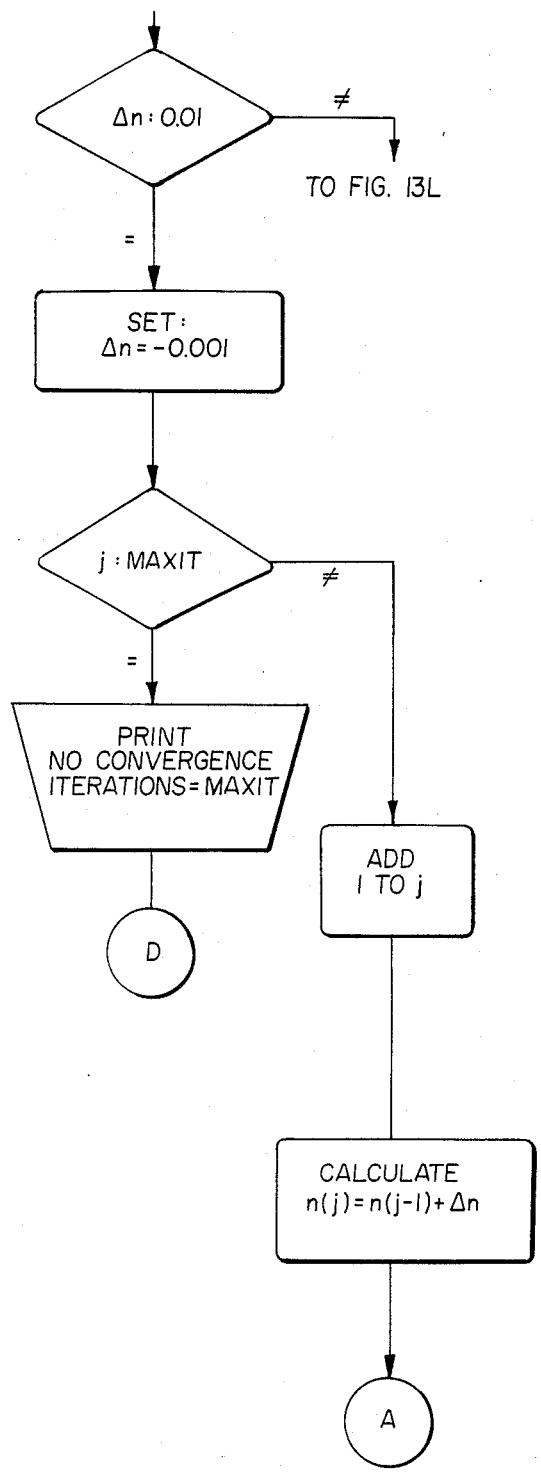
FIG. 13J
FIG. 13K

METHOD FOR DETERMINING THE EFFECTIVE WATER SATURATION IN A LOW-RESISTIVITY HYDROCARBON-BEARING ROCK FORMATION BASED UPON ROCK MATRIX CONDUCTANCE

BACKGROUND OF THE INVENTION

A characteristic common to all known types of productive low-resistivity reservoirs is their capacity to produce virtually water-free oil and/or gas even though log-derived water saturations based upon the formation factor and resistivity index equations, set forth by G. E. Archie in "The Electrical Resistivity Log As An Aid In Determining Some Reservoir Characteristics," *Trans. AIME*, No. 146, pp. 54–62, 1942, may be greatly in excess of fifty percent. These productive low-resistivity formations can be explained in terms of a conductive free-fluid pore network and a conductive rock matrix. The problem is that the Archie formation factor, resistivity index, and related equations, which have been the bases for quantitative electric log analysis for more than forty years, assume conductance only through the pore fluid network. These empirically derived equations relate electrical conduction to porosity and water saturation and have been so useful in the analysis of clean formations that they are often referred to as "Archie's Laws."

The Archie equations are strictly applicable to the analysis of clean formations, formations with a matrix or framework that is so nearly an insulator that total electrical conductance is determined by conduction through the tortuous paths of the pore water. Not many "clean formations" exist in nature, and by the early 1950's log anaysts recognized that a strict application of the Archie equations to the analysis of shaly formations produced a higher-than-actual water saturation. How to correct for the added electrical conductance due to clay minerals is, to the log analyst, "the shaly-sand problem."

However, clay minerals are not the only minerals that can add to the total conductance of a rock. Minerals, such as pyrite, magnetite, graphite-like organic matter, and capillary bound irreducible water, can contribute and even dominate electrical conductance in a rock. If this conductance is not properly included in electric log analysis, producible oil can be mistaken for water.

Since Archie (1942) introduced the foundation concepts for quantitative electric log analysis, many modifications to the Archie model have been proposed to better describe the observed electrical properties of fluid-filled rocks. As illustrated by three recent models, the Waxman-Smits model (M. H. Waxman and L. J. M. Smits, "Electrical Conductivities in Oil-Bearing Shaly Sands", *Soc. Petr. Eng. J.*, (Trans. v. 243), pp. 107–122, 1968), a dual-water model (C. Clavier, G. R. Coates and J. Dumanoir, "The Theoretical and Experimental Bases for the 'Dual Water Model' for the Interpretation of Shaly Sands", 52nd Annual Fall Technical Conference and Exhibition of the Society of Petroleum Engineers of AIME, Denver, Paper SPE 6589, 1977) and a dual-porosity model (J. Raiga-Clemenceau, C. Fraisse and Y. Grosjean, "The Dual-Porosity Model, A Newly Developed Interpretation Method For Shaly Sands", SPWLA 25th Annual Logging Symposium, New Orleans, Paper F, 1984), the primary effort has been to modify the Archie formation factor to include specific mechanisms that would make a rock more conductive. When a number of different and valid mechanisms exist, an inherent weakness of any model based upon a specific mechanism is that it will be limited in its application.

SUMMARY OF THE INVENTION

The present invention is directed to a method for determining water saturation in a low-resistivity, hydrocarbon-bearing subsurface rock formation. Both a free-fluid pore network conductance and a rock matrix conductance are determined. Water saturation is determined from the parallel combination of such free-fluid pore network conductance and such rock matrix conductance.

In one aspect of the invention, the subsurface formation is traversed with an electric logging tool. The formation porosity and formation resistivity are measured with the electric logging tool. Water resistivity is measured from samples of formation water, but under some conditions can be inferred from the SP (spontaneous potential) log. Core samples are taken from the formation water and electrical measurements are made on such core sample that reflect both a free-fluid pore network conductance and a rock matrix conductance. These core sample measurements and electric log measurements are combined to identify formation water saturation corrected for rock matrix conductance.

DESCRIPTION OF THE PREFERRED EMBODIMENT

Figure 1:
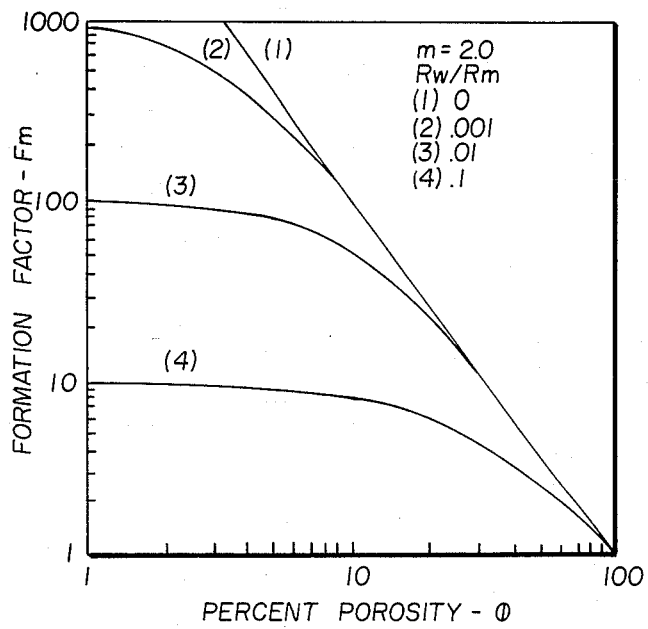
FIGS. 1 and 2 illustrate the effect of matrix conductance on formation factor and porosity exponent.

The present invention is directed to a new method for the analysis of low-resistivity reservoirs which describes the basic features of a productive formation in terms of a model consisting of two parallel parts: (1) a conductive pore network containing fluids which are free to move, and (2) the remainder of the rock which may be conductive due to conductive minerals and/or immobile conductive water. The model assumes the Archie formation factor and resistivity index equations to be valid for the free-fluid pore network, and it treats the parallel matrix conductance strictly as an electrical property independent of aRy specific conductive mechanism. The formation factor and resistivity equations derived for the model are much different than the Archie equations but reduce to them, as they should, for matrix conductance equal to zero. The model differs from the many shaly-sand models in its formulation and application in that the problem is approached primarily through the resistivity index rather than the formation factor. The model correctly describes the basic features of a productive formation that by Archie analysis appears to be very wet.

The model further shows that the distribution of a conductive mineral in the rock can be equally as important as the amount or the type of mineral in establishing the electrical conductance of the rock matrix.

This new method is based on the following concepts: (i) the total electrical rock conductance can be represented by two conductors in parallel; one a conductive pore network containing fluid which is free to move, and the other the rest of the rock (the matrix) which may be conductive due to conductive minerals and/or immobile conductive water, and (ii) the Archie formation factor and resistivity index are valid for the free-fluid pore network, and aRy conductance due to the matrix can be treated strictly as an electrical property independent of any specific conductive mechanism.

The total electrical conductance of a rock can be represented by two resistors in parallel. The electrical conductance $1/R$ of two resistors in parallel is equal to the sum of the conductances (not conductivities), i.e., $$1/R = 1/R_p + 1/R_m, \tag{1}$$

where $R_p$ is the resistance of the free-fluid pore network, and $R_m$ is the resistance of the matrix.

For a fully saturated rock ($S_w = 1$), $R = R_{om}$, $R_p = R_o$, and $$1/R_{om} = 1/R_o + 1/R_m, \tag{2}$$

For a partially saturated rock ($S_w < 1$), $R = R_{tm}$, $R_p = R_t$, and $$1/R_{tm} = 1/R_t + 1/R_m. \tag{3}$$

The Archie formation factor is defined as $$F = \rho_o/\rho_w = R_o/R_w = \phi^{-m} \tag{4}$$

where $R_w$ is the resistance of a volume of water having the same geometric factor as $R_o$. The measured formation factor for the parallel network is $$F_m = \rho_{om}/\rho_w = R_{om}/R_w. \tag{5}$$

$R_{om}$ can be written using Equation (2) as $$R_{om} = R_m R_o/(R_o + R_m),$$

and substituting in Equation (5)

$$F_m = R_{om}/R_w = [R_m/(R_o+R_m)](R_o/R_w) = [R_m/(R_o+R_m)]F, \text{ or } F = a\phi^{-m} \tag{6}$$

where $$a = R_m/(R_o+R_m) = R_m\phi^m/(R_w+R_m\phi) \text{ and } a \leq 1. \tag{7}$$

The parameter a is, in fact, a variable dependent upon porosity, water resistivity, and matrix resistance.

The Archie resistivity index is defined as $$I = \rho_t/\rho_o = R_t/R_o = S_w^{-n}. \tag{8}$$

By substitution in Equation (3)

$$1/R_{tm} = S_w^n/R_o + 1/R_m \tag{9}$$

The measured resistivity index for a parallel network is $$I_m = \rho_{tm}/\rho_{om} = R_{tm}/R_{om} \tag{10}$$

Substituting for $R_{tm}$ (Equation 9) and $R_{om}$ (Equation 2)

$$1/I_m = S_w^n[R_m/(R_o+R_m) + R_o/(R_o+R_m)] \text{ or} \tag{11}$$

$$1/I_m = aS_w^n + (1-a). \tag{12}$$

From Equations (5), (6), (10), and (12), it follows that the general water saturation equation is $$S_w = \left[ \frac{\rho_w}{\rho_{tm}\phi^m} + \left(1 - \frac{1}{a}\right) \right]^{1/n} \tag{13}$$

and Equation (13) reduces to $$S_w = \left[ \frac{\rho_w}{\rho_t\phi^m} \right]^{1/n} \tag{14}$$

for a nonconducting matrix. A comparison of the foregoing with the Archie formation factor, resistivity index, and water saturation equations is shown in Appendix 1. A complete list of symbols is shown in Appendix 2.

Equation (6) can be written as $$F_m = a/\phi^m = 1/\phi^{m_a} \tag{15}$$

and for $a < 1$, $m_a < m$, i.e., for a given porosity the effect of matrix conductance causes m to appear smaller. Equation (15) written in terms of $R_w$ and $\phi$ is $$F_m = 1/(R_w/R_m + \phi^m) \tag{16}$$

Figure 2:
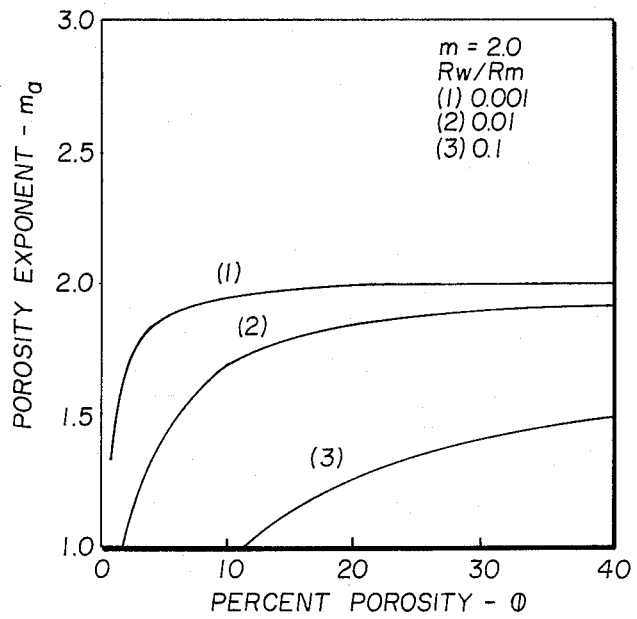

The effect of matrix conductance on the formation factor and porosity exponent is shown by the families of curves in FIGS. 1 and 2. The curves were generated using Equation (16) for different values of $R_w/R_m$ and $m = 2$.

Equation (11) can be written as $$1/I_m = S_w^n[1/(1+R_o/R_m)] + 1/(1+R_m/R_o). \tag{17}$$

Figure 3:
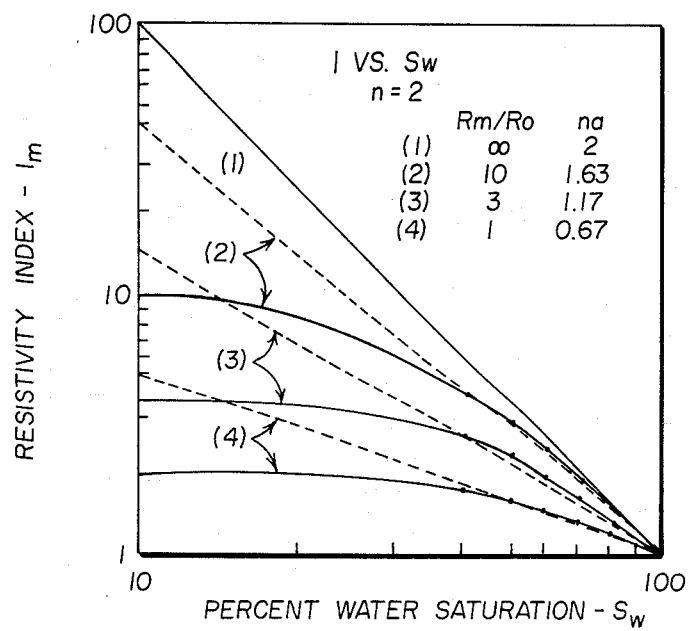
FIG. 3 illustrates the effect of matrix conductance on resistivity index.

The effect of matrix conductance on the resistivity index is shown by the family of solid curves in FIG. 3. The curves were generated using Equation (17) for different values of $R_m/R_o$ and $n = 2$. The curves show that $I_m$ approaches a maximum value at $S_w = 0$ and that the maximum value decreases as the ratio $R_m/R_o$ decreases.

Shown also in FIG. 3 by the solid circles are the calculated values for $I_m$ for $S_w = 1.0$ to $0.4$ in steps of $0.1$ for $R_m/R_o = 10$, 3, and 1. This is about the range of $S_w$ which most laboratories desaturate cores to obtain saturation exponents using the Archie resistivity index equation. The values $n_a$ shown in the FIGURE are the negative slopes of the dashed lines generated from the equation $$\text{Log } I = -n_a \text{ Log } S_w \tag{18}$$

when fit to the data by a linear regression required to pass through $S_w = 1$ at $I = 1$. The effect of matrix conduction on $n_a$, the apparent value of n, is to decrease the value of $n_a$ with each successive $S_w$; therefore, it would be easy to conclude incorrectly that n is a function of $S_w$ and not a constant parameter characteristic of the rock'pore network.

Figure 4:
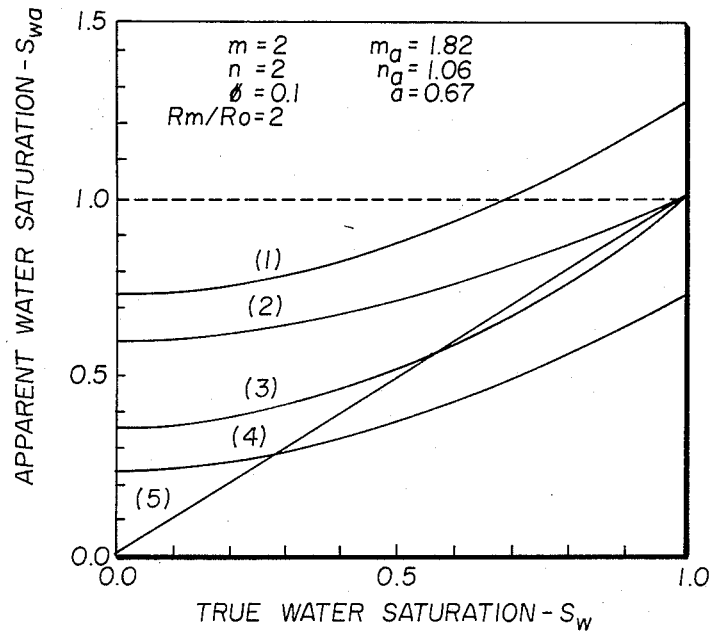
FIGS. 4–6 illustrate the effect of matrix conductance on water saturation.
Figure 5:
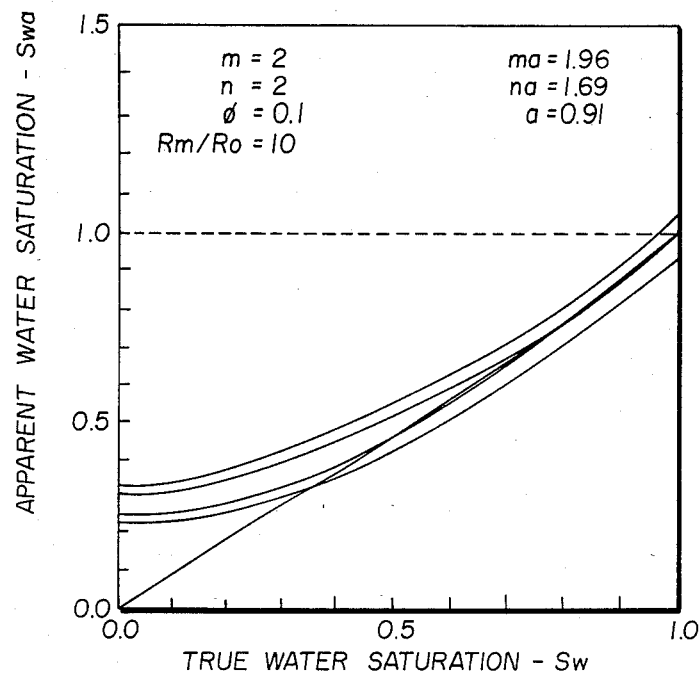
Figure 6:
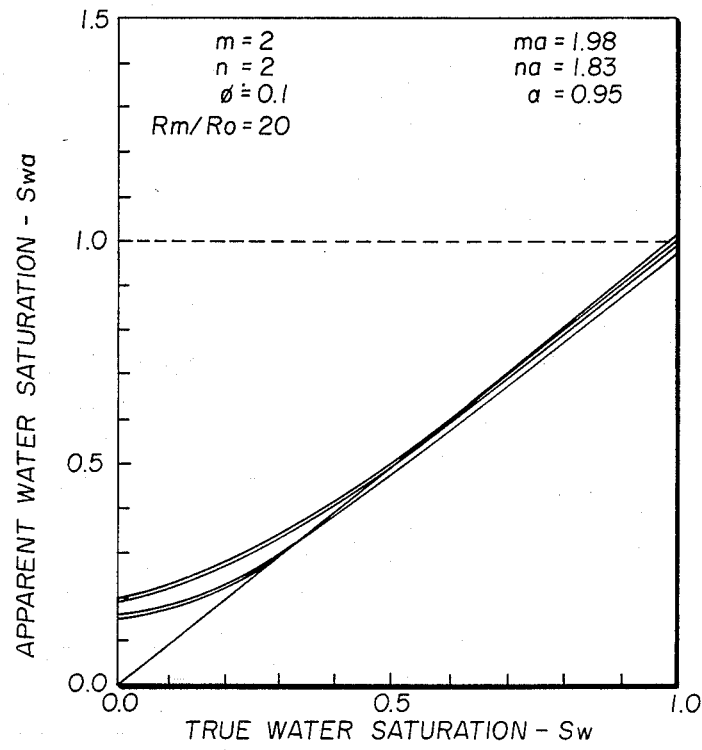

The effect of matrix conduction on water saturation using the standard and generalized Archie water saturation Equations (1)-(4), and compared to the conductive rock matrix model saturation Equation (5), is shown in FIGS. 4, 5, and 6 for different values of For $R_m/R_o$. For $R_m/R_o > 10$; all $S_w$ equations begin to converge to the true water saturation. Depending on the $S_w$ equation used and the chosen values of n, m, and a, formations with $R_m/R_w < 10$ can be interpreted as wet, but containing oil, and vice versa.

Resistivity index data may be analyzed in terms of the resistivity index, Equation (12), or resistance, Equation (9). Both are nonlinear equations of the form, $$Y = b X^n + c. \qquad (19)$$

For a given value of n the equation is linear, and nonlinear regression analysis of data is done by successive linear regressions with n being the only independent iterative variable. The slope, b, and intercept, are dependent iterative variables by this method. The criterion chosen for stopping the iterative process is a minimum in the sum of the squared residuals at the smallest iterative increment, $\Delta n = 0.001$.

Any set of data, even bad data, can be represented mathematically given enough parameters. However, attributing physical meaning to the values of the unknown parameters by non-linear regression analysis must be done with caution. First, the mathematical model must adequately represent the phenomenon under study. Second, the unknown parameters must have physical meaning in the model (i.e., not just curve fitting parameters). Third, the values should be physically reasonable. Fourth, the values, when used in other model equations, must be consistent. For example, analysis of data using both Equation (12), and Equation (9) should converge to the same values of n and $R_m/R_o$. Fifth, convergence should be to a global minimum in the sum of the squared residuals. All data analyzed so far have met at least these criteria.

Figure 7:
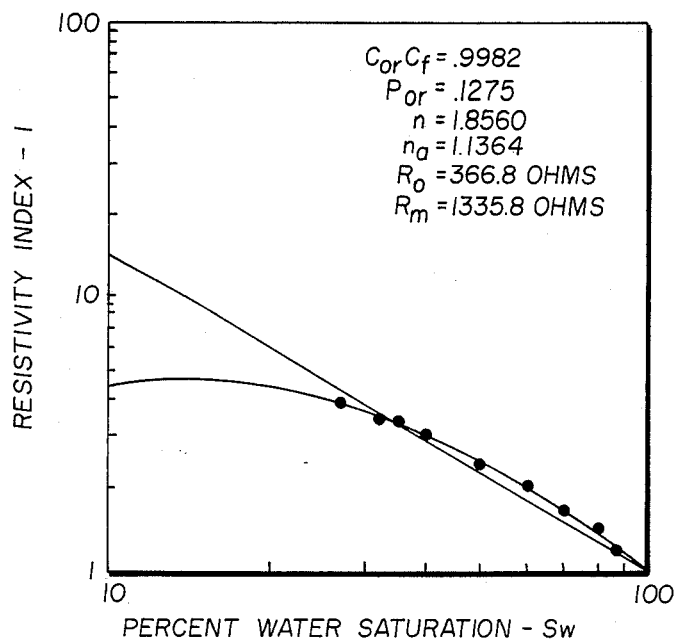
FIG. 7 illustrates resistivity index data for a core sample from the formation.
Figure 8:
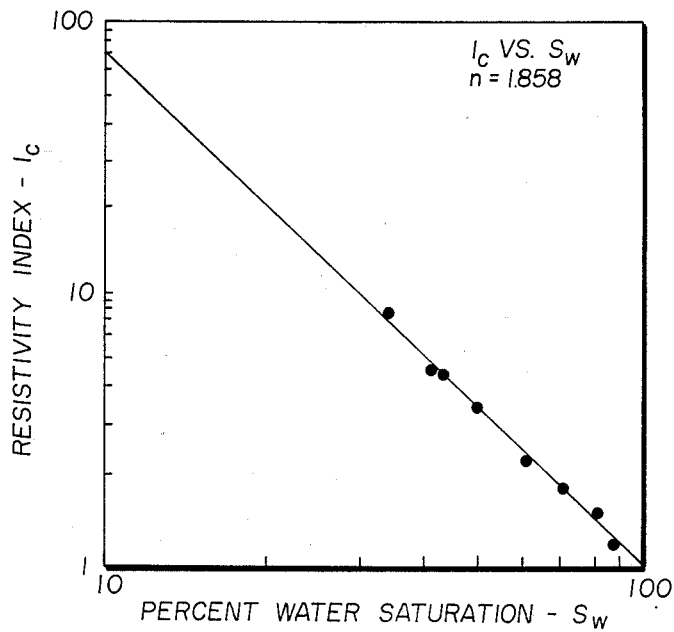
FIG. 8 illustrates measured resistivity index corrected for matrix conductance.

To illustrate how the conductive rock matrix model parameters are obtained, the analysis of ten core samples from the same formation, but from five widely separated wells is shown. Analysis was made both in terms of resistance (Equation 9) and resistivity index (Equation 12). Both analyses converged to the same value of n and the same ratios $R_m/R_o$. Standard Archie analysis of the resistivity index data gave values of n of about 1 for each sample. The resistivity index data for sample 1 is shown in FIG. 7. The straight line with slope $-n_a$ (apparent saturation exponent) is a least-squares fit of the Archie resistivity index to the data with a restraint that $I = 1$ at $S_w = 1$. The curve through the data was generated using Equation (11) with the value of $R_o$, $R_m$, and n from the regression analysis. Having determined $R_o$ (or a), the measured resistivity index can be corrected for matrix conductance (1/Rm), and the result is shown in FIG. 8. The straight line was calculated using the standard Archie resistivity index and the value of $n = 1.856$ from the conductive rock matrix model analysis. Once $R_o$, $R_m$, or a is found, the corrected value of m is found using Equation (6).

The values of $n_a$, n, $m_a$, m, $R_m/R_o$, $F_m$, F, correlation coefficient, t (tortuosity), and clay data for the ten samples are listed in Appendix 3. It was initially thought the values of n might cluster about some common value, e.g., n=2. However, the values of n from the regression analysis for the ten samples range from a low value of 1.32 to a high value of 2.16 and have an average value of 1.70. The fact that resistivity index data for each sample, when corrected for matrix conductance, produces data that satisfy the Archie resistivity index equation, and the value of n obtained from the regression suggests that n is not a function of water saturation $S_w$; and n is a function of some characteristic property of a rock.

Tortuosity is a concept that describes the complex nature of the interconnecting paths through a rock specimen. The tortuosity coefficient is defined as $$t = L_e/L \qquad (20)$$

and describes the excess length of the equivalent electrolytic path, $L_e$, relative to the actual length, L, of the specimen. In terms of the Archie formation factor, t is given by $$t = (F\phi)^{1/2} \qquad (21)$$

Figure 9:
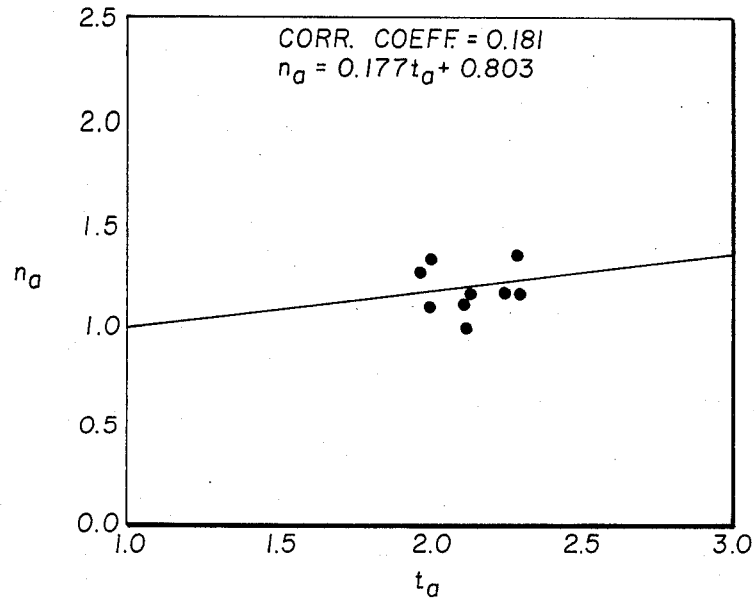
FIGS. 9 and 10 illustrate plots of saturation exponents versus tortuosity.
Figure 10:
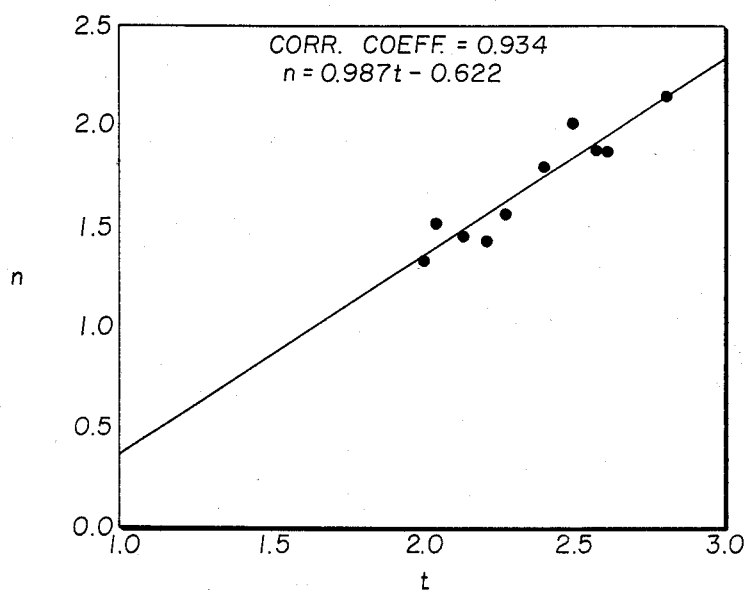
Figure 11:
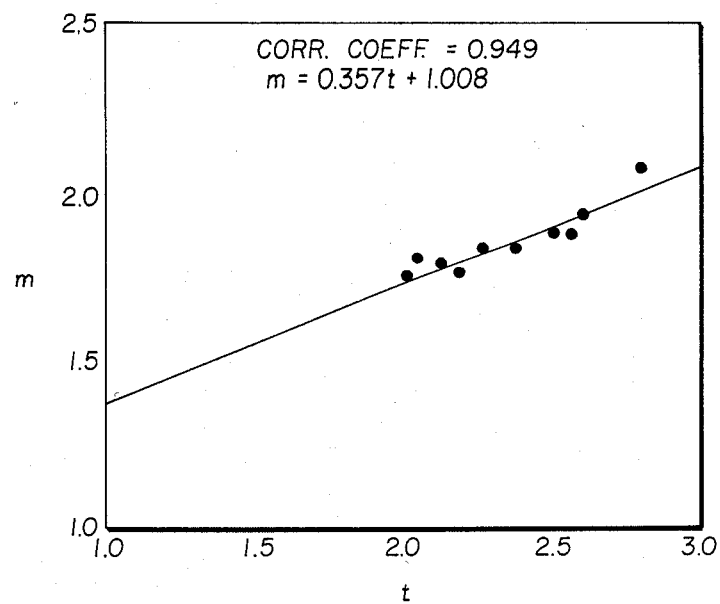
FIGS. 11 and 12 illustrate plots of porosity exponent versus tortuosity and saturation exponent.
Figure 12:
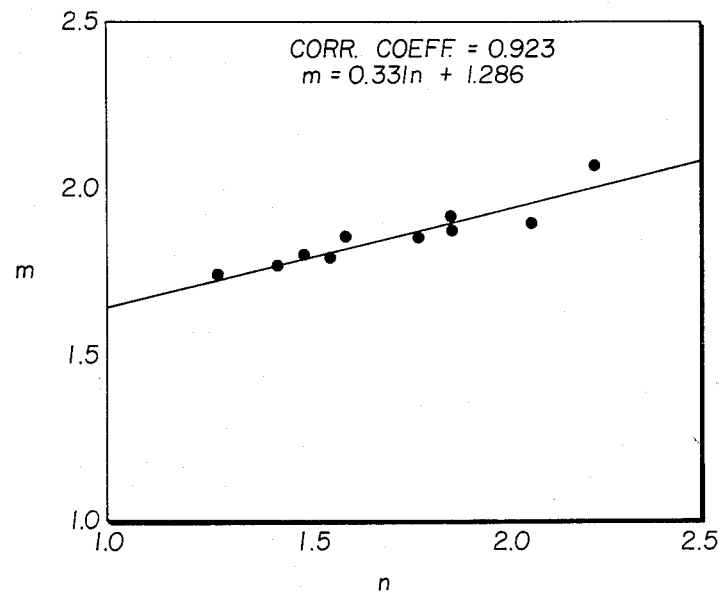

Both the apparent tortuosity coefficient using $F_m$ and $\phi$ and the tortuosity coefficient using the corrected F were calculated for the ten core samples. A plot of apparent saturation exponent $n_a$ versus $t_a$ is shown in FIG. 9. For this data, the correlation coefficient is 0.181. A plot of n versus t is shown in FIG. 10, and the correlation coefficient is 0.934. A plot of the corrected porosity exponent, m versus t, is shown in FIG. 11, and the correlation coefficient is 0.945. A plot of m versus n is shown in FIG. 12, and the correlation coefficient is 0.923. The high degree of correlation between n and t compared to the noncorrelation of $n_a$ and $t_a$ suggests that the values of $R_o$, $R_m$, a, and n from the conductive rock matrix model analysis are characteristic of the specimen. The high degree of correlation between n and t, m and t, and n and m suggests that n and m are not independent rock parameters, and n and m are both related to the complexity of the interconnecting electrolytic paths in a rock specimen.

The dominant mineral in the ten samples is illite. There is no correlation between the magnitude of matrix conductance $R_m/R_o$) and the amount of clay minerals. Micrographs show that the clay minerals form a distribution of micropores of differing degrees of complexity that bind water by capillary forces. These analyses suggest that the matrix conductance is due primarily to capillary-bound water in a microporous structure formed mostly by illite; that low cation exchange capacity (CEC) clay minerals can greatly influence rock conductance; and that the distribution of the mineral is equally as important in contributing to electrical conductance as is the amount and type of mineral.

In carrying out the method of the present invention, both electric logs and core samples, taken from a low-resistivity reservoir, are used in calculating effective water saturation. Such calculation is in accordance with water saturation Equation (13) hereinabove, which is based on a conductive rock matrix model represented by: (i) a conductive pore network containing fluids which are free to move, and (ii) the remainder of the rock which may be conductive due to conductive minerals and/or immobile conductive water. The parameters $\rho_{tm}$ and $\phi$ are derived from electric logs of the reservoir formation. Parameter $\rho_w$ may be derived from electric logs or other formation tests. Parameters m, a and n are from analysis of core samples taken from the formation in terms of Equations (9), (12) and (15) hereinabove. Using these measured parameters, the effective water saturation, determined from Equation (13), may be used to determine oil saturation of the reservoir:

$$S_o = 1 - S_w \qquad (22)$$

Such oil saturation is representative of the producible hydrocarbon (oil and/or gas) potential of the reservoir.

Figure 13A:
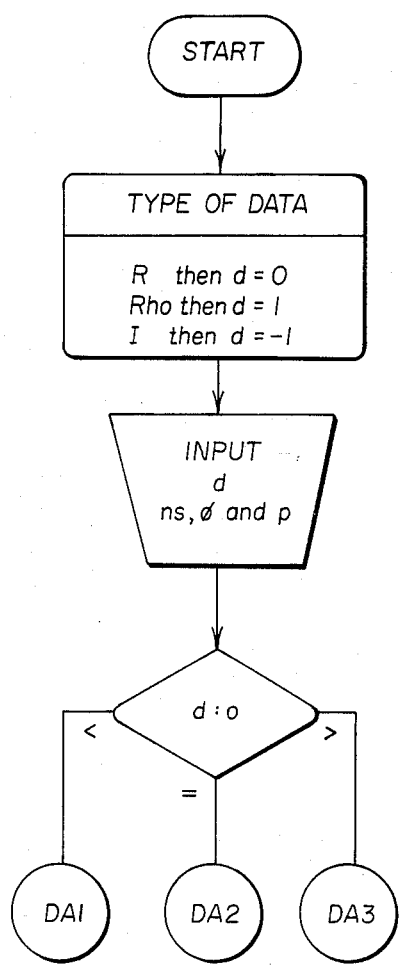
FIGS. 13A–13N are a flow chart of a method for carrying out the data analysis steps of the present invention.
Figure 13B:
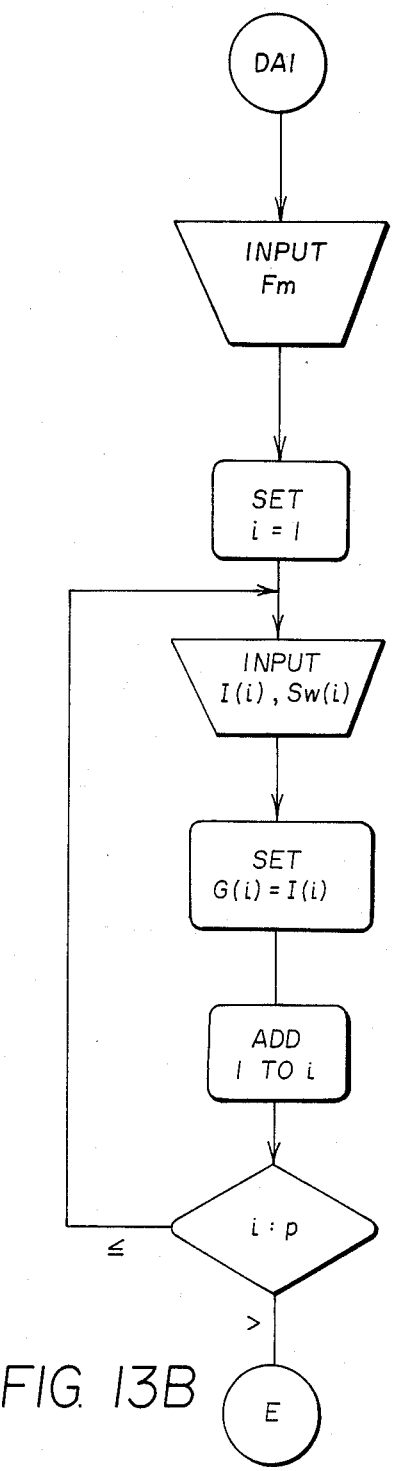
Figure 13C:
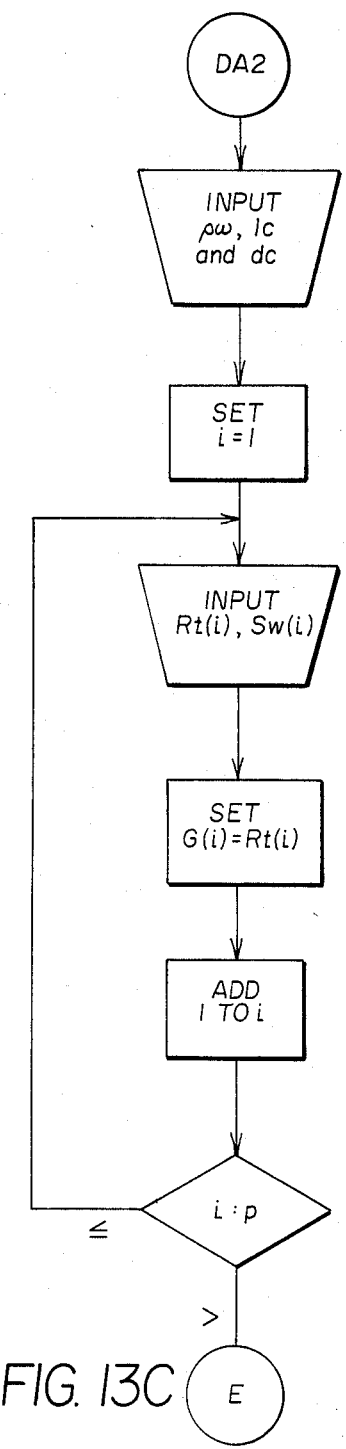
Figure 13D:
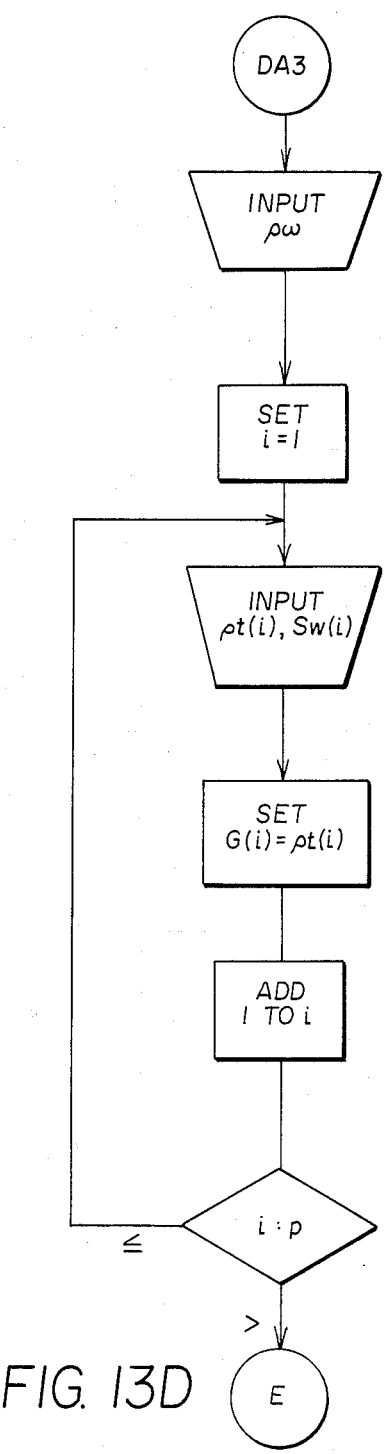
Figures 13E, 13F:
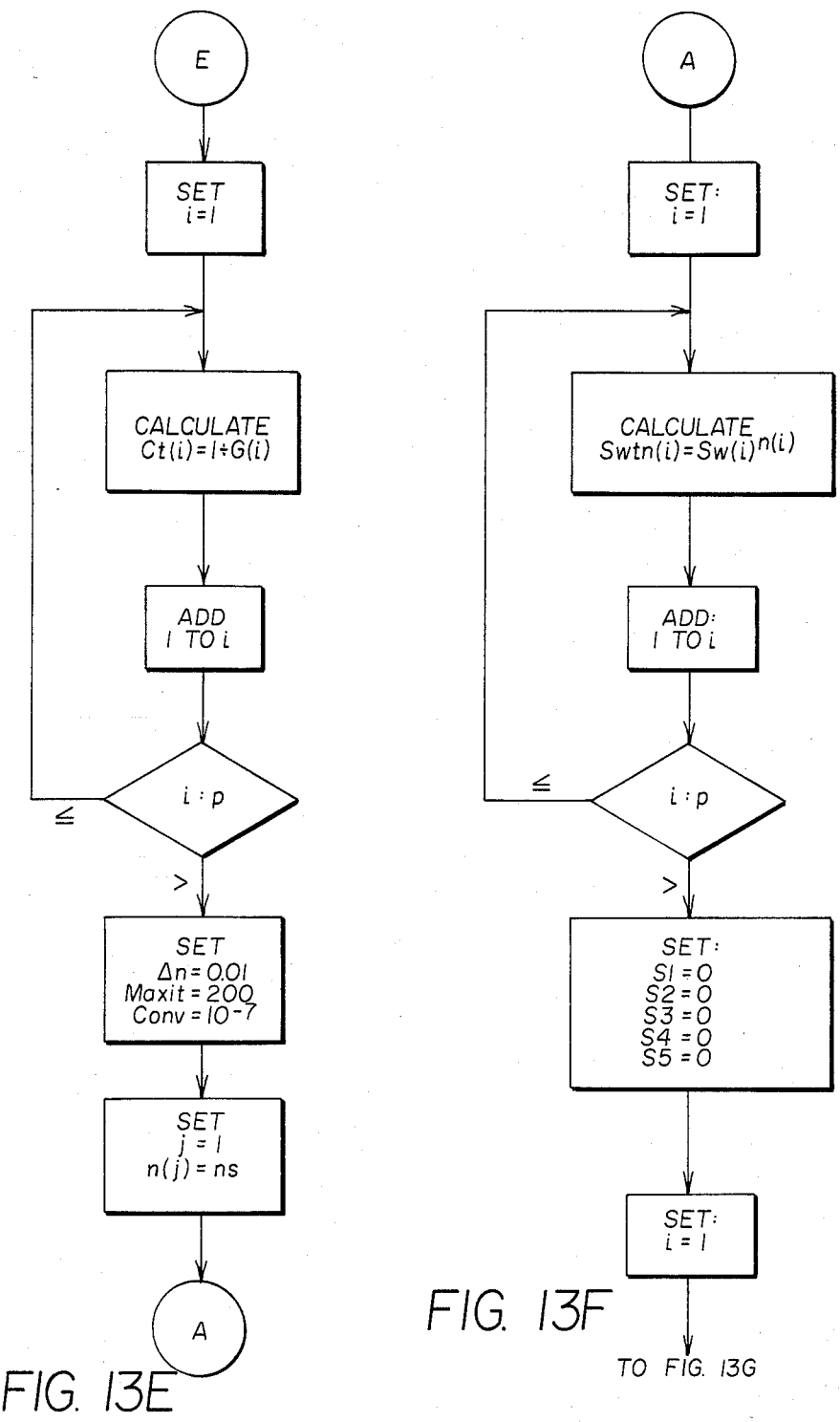
Figure 13G:
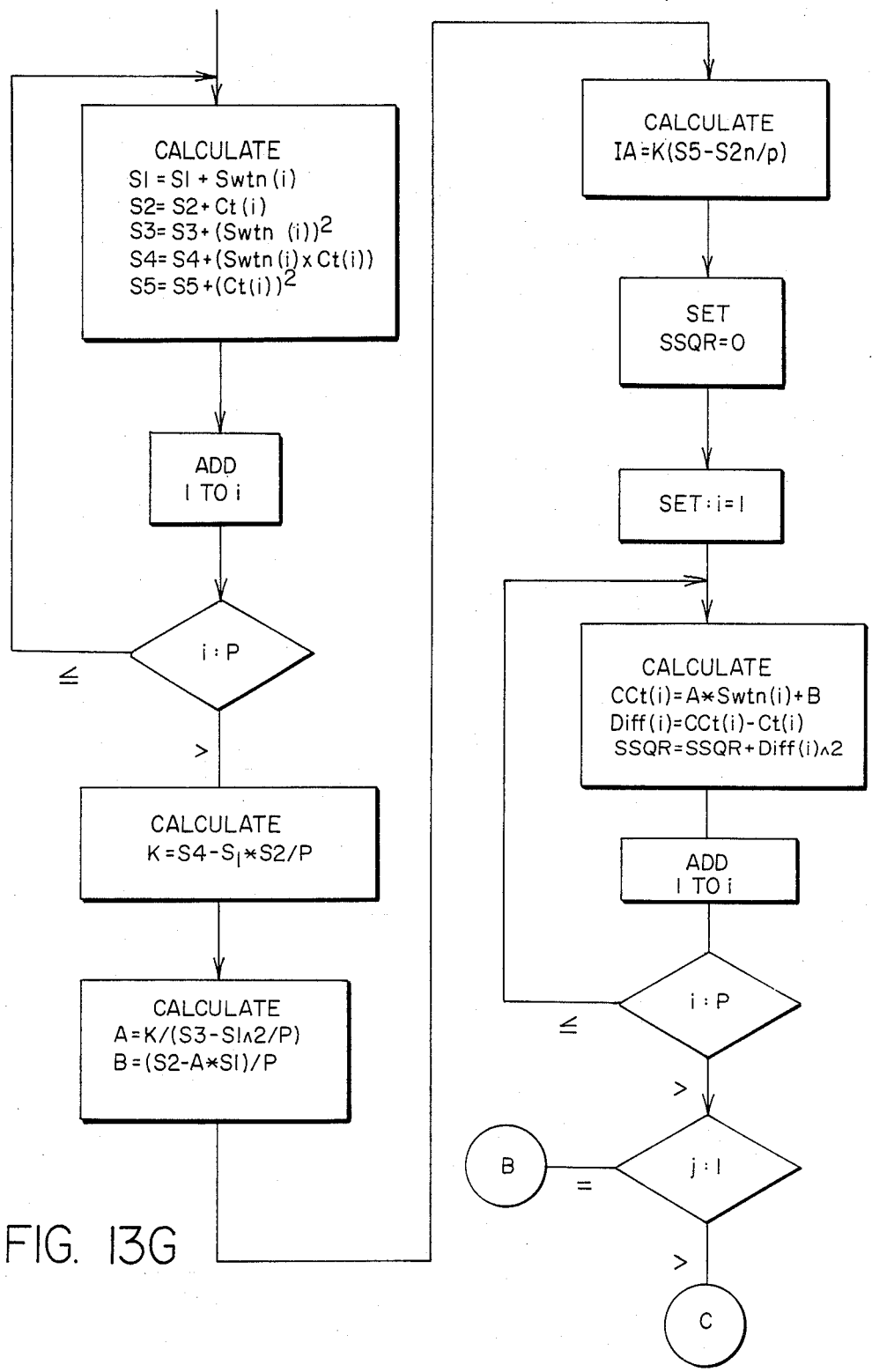
Figure 13H:
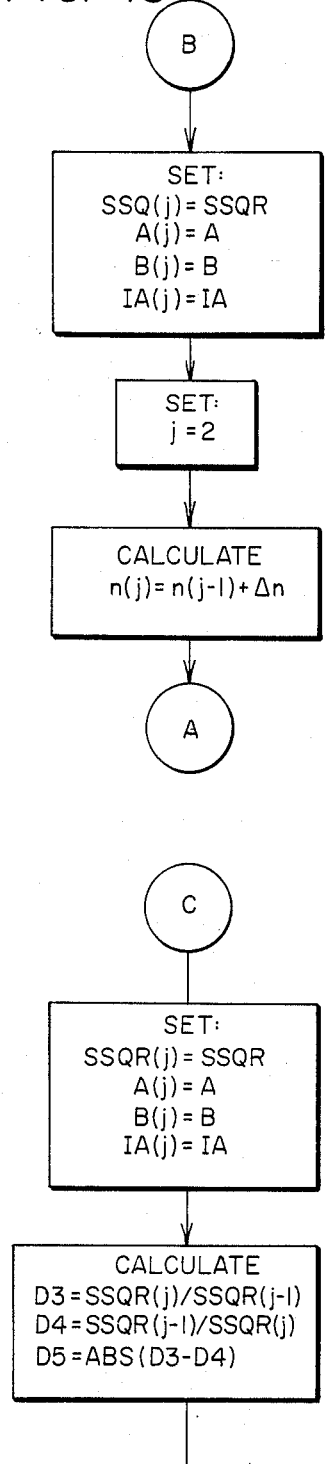
Figure 13I:
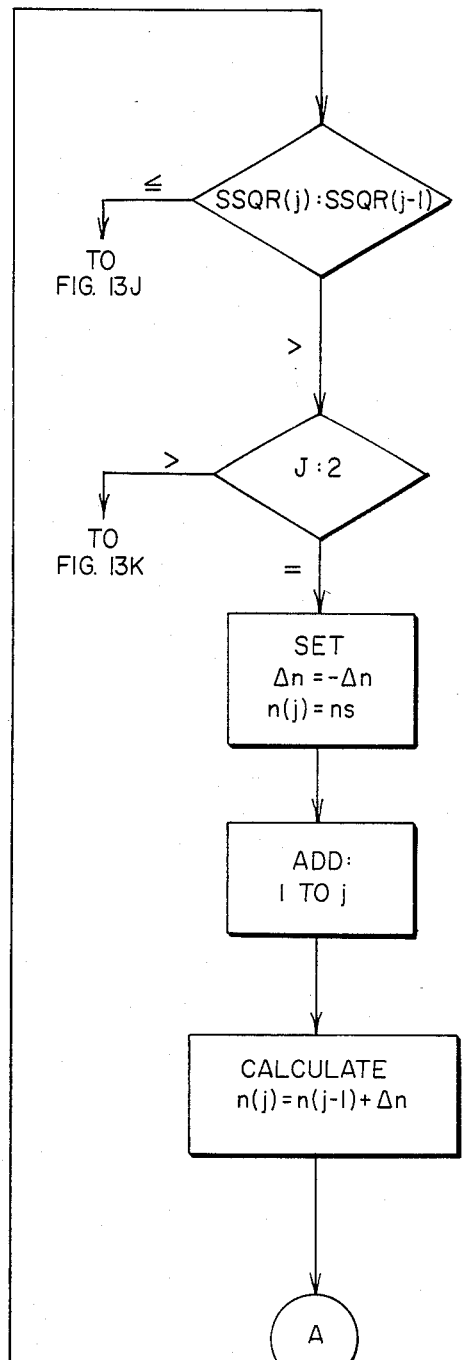
Figure 13L:
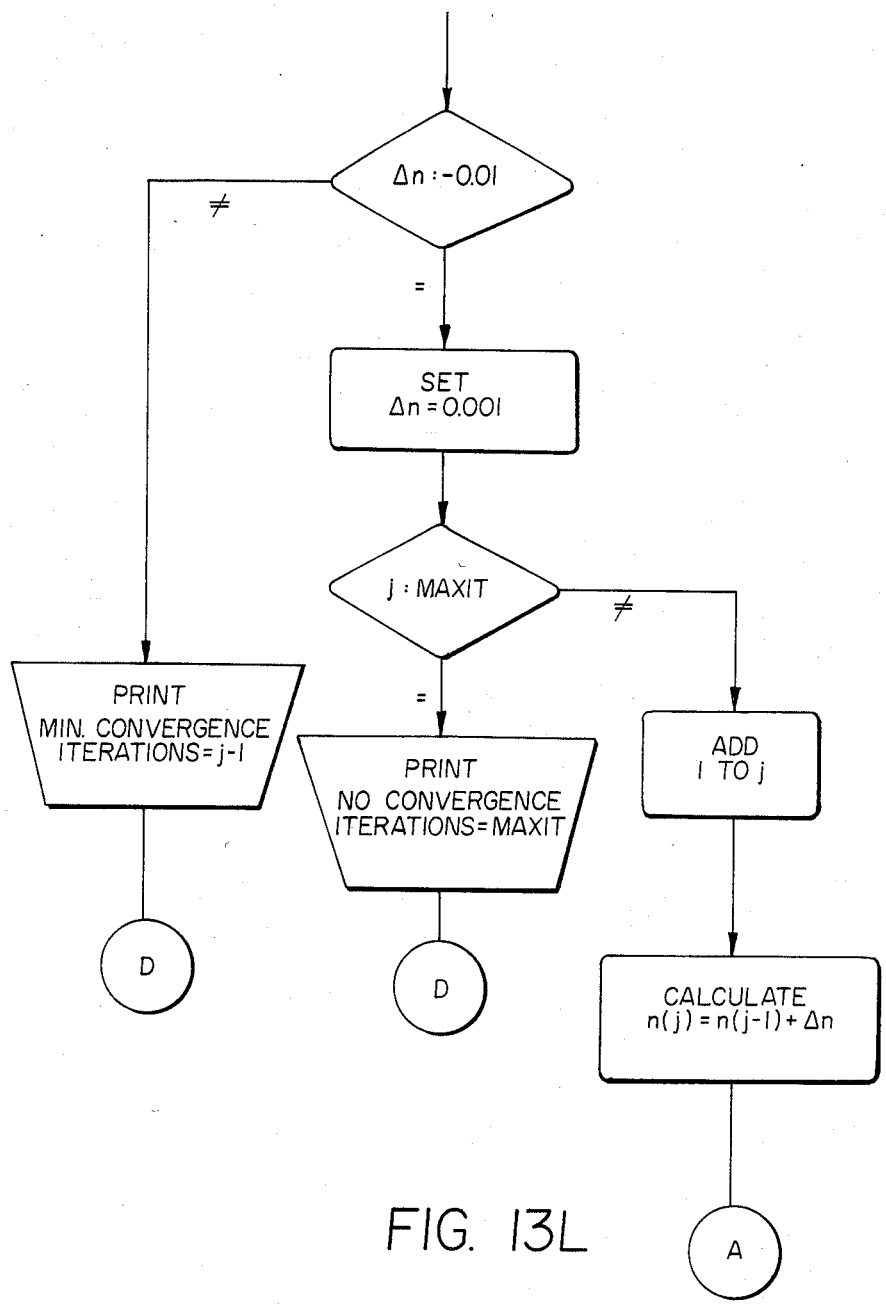
Figures 13M, 13N:
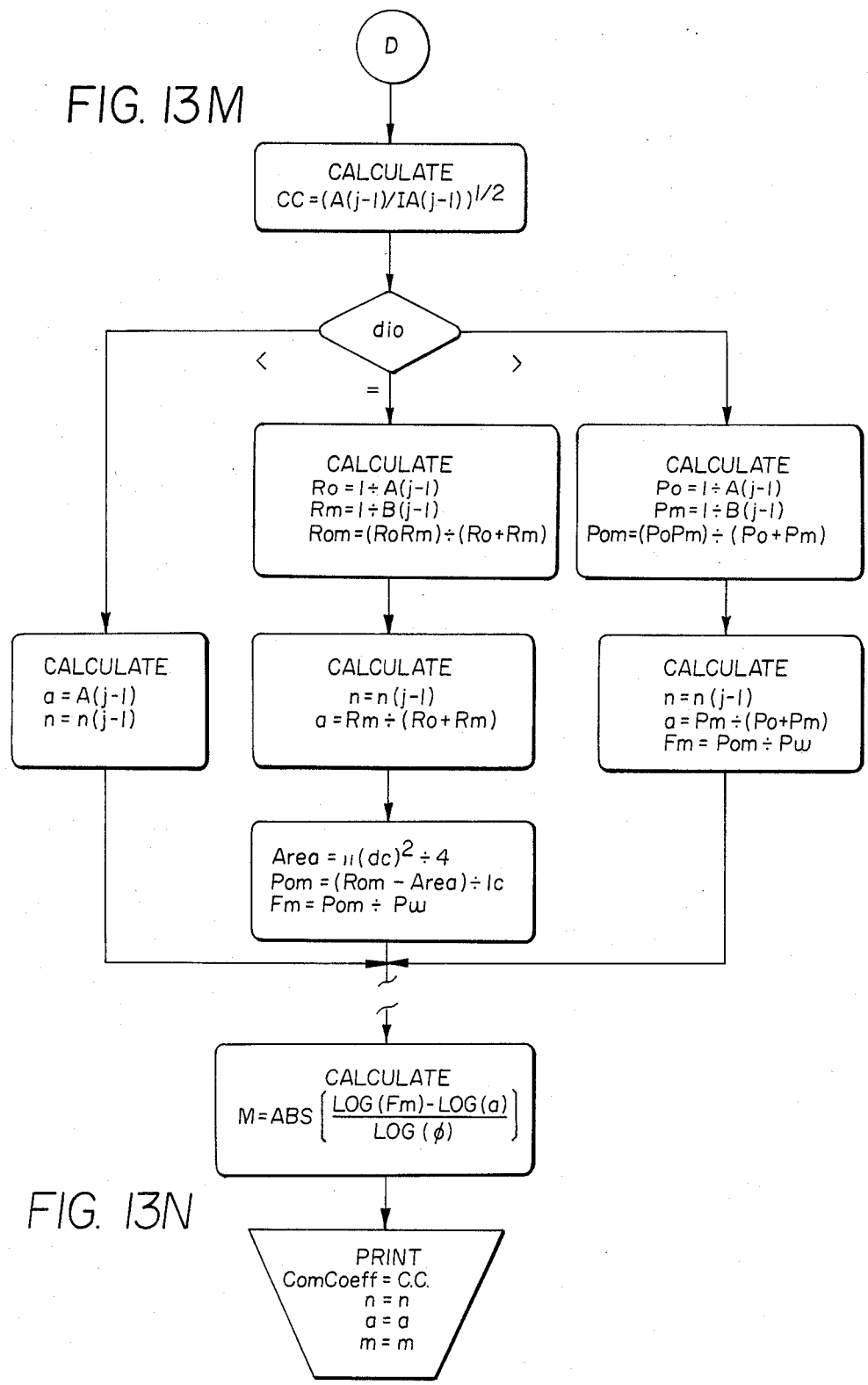

Referring now to FIGS. 13A–13N, there is illustrated a flow chart of the steps utilized in carrying out the conductive rock matrix model analysis of a low-resistivity reservoir in accordance with the method of the present invention. The printout of the correlation coefficient, cc, is a measure of how well the conductive rock matrix model fits the data. The printout of the parameters n, m and a are the rock parameters needed for calculating the formation effective water saturation in accordance with Equation (13). A list of the symbols used in the flow chart of FIGS. 13A–13N is shown in Appendix 4.

APPENDIX 1

| CONDUCTIVE MATRIX | | NONCONDUCTIVE MATRIX (ARCHIE EQUATIONS*) | |
|---|---|---|---|
| $F_m = \dfrac{\rho_{om}}{\rho_w} = \dfrac{R_{om}}{R_w}$ | (5) | $F = \dfrac{\rho_o}{\rho_w} = \dfrac{R_o}{R_w}$ | (4) |
| $F_m = a\phi^{-m}$ | (6) | $F = \phi^{-m}$ | (4) |
| $a = \dfrac{R_m}{R_o + R_m}$ | (7) | | |
| $\dfrac{1}{I_m} = aS_w^n + (1 - a)$ | (12) | $\dfrac{1}{I} = S_w^n$ | (8) |
| $S_w = \left( \dfrac{\rho_w}{\rho_{tm}\phi^m} + 1 - \dfrac{1}{a} \right)^{1/n}$ | (13) | $S_w = \left( \dfrac{\rho_w}{\rho_t\phi^m} \right)^{1/n}$ | (14) |

*Equations are numbered as they appear in the body of the specification.

APPENDIX 2
LIST OF SYMBOLS FOR EQUATIONS (1)–(22)

| | |
|---|---|
| $\phi =$ | Volume of pore space per unit volume of rock (porosity). |
| $\rho_w =$ | Electrical resistivity of pore water. |
| $R_w =$ | The resistance of a specified geometric volume of water having a resistivity of $\rho_w$. |
| $\rho_o =$ | Electrical resistivity of a porous rock with no matrix conductance and fully saturated ($S_w = 1$) with water having resistivity $\rho_w$. |
| $R_o =$ | Electrical resistance of a porous rock with no matrix conductance and a resistivity $\rho_o$. |
| $\rho_t =$ | Electrical resistivity of a porous rock with no matrix conductance and partially saturated ($S_w < 1$) with water having a resistivity of $\rho_w$. |
| $R_t =$ | Electrical resistance of a porous rock with no matrix conductance and a resistivity $\rho_t$. |
| $\rho_{om} =$ | Electrical resistivity of a porous rock with matrix conductance and fully saturated with water having a resistivity $\rho_w$. |
| $R_{om} =$ | Electrical resistance of a porous rock with matrix conductance and a resistivity $\rho_{om}$. |
| $\rho_{tm} =$ | Electrical resistivity of a porous rock with matrix conductance and partially saturated with water having a resistivity $\rho_w$. |
| $R_{tm} =$ | Electrical resistance of a porous rock with matrix conductance and a resistivity $\rho_{ta}$. |
| $R_m =$ | Effective electrical resistance of the rock matrix. |
| $R_p =$ | Effective electrical resistance of the free-fluid pore network $R_p = R_o$ for $S_w = 1$, and $R_p = R_t$ for $S_w < 1$. |
| $F =$ | Formation factor for a porous rock with no matrix conductance. |

APPENDIX 2 -continued
LIST OF SYMBOLS FOR EQUATIONS (1)–(22)

| | |
|---|---|
| $F_m =$ | Measured formation factor for a porous rock with conductance. |
| $m =$ | Porosity exponent for a porous rock with no matrix conductance. |
| $m_a =$ | Apparent porosity exponent for a porous rock with matrix conductance. |
| $S_w =$ | Fractional water saturation. |
| $I =$ | Resistivity index for a porous rock with no matrix conductance. |
| $I_m =$ | Measured resistivity index for porous rock with matrix conductance. |
| $I_c =$ | Measured resistivity index for a porous rock with matrix conductance and corrected for matrix conductance. |
| $n =$ | Saturation exponent for a porous rock with no matrix conductance. |
| $n_a =$ | Apparent saturation exponent for a porous rock with matrix conductance. |
| $t =$ | Tortuosity index for a porous rock with no matrix conductance. |
| $t_a =$ | Apparent tortuosity index for a porous rock with matrix conductance. |

APPENDIX 3
SUMMARY CORE PARAMETERS

| CORE NO. | $\phi$ | $n_a$ | n | $m_a$ | m | Corr. Coeff.** | $F_m$ | F |
|---|---|---|---|---|---|---|---|---|
| 1 | 0.128 | 1.14 | 1.86 | 1.81 | 1.92 | 0.998 | 41.3 | 52.6 |
| 2 | 0.162 | 1.31 | 1.52 | 1.76 | 1.78 | 0.999 | 24.4 | 25.5 |
| 3 | 0.122 | 1.09 | 1.44 | 1.70 | 1.76 | 0.999 | 35.8 | 40.4 |
| 4 | 0.151 | 1.24 | 1.32 | 1.71 | 1.73 | 0.999 | 25.4 | 26.6 |
| 5 | 0.139 | 1.06 | 1.48 | 1.71 | 1.78 | 0.999 | 29.0 | 33.2 |
| 6 | 0.128 | 1.36 | 2.04 | 1.80 | 1.89 | 0.988 | 40.4 | 48.9 |
| 7 | 0.130 | 1.33 | 1.78 | 1.80 | 1.85 | 0.997 | 39.3 | 43.7 |
| 8 | 0.117 | 1.14 | 1.86 | 1.75 | 1.88 | 0.998 | 42.7 | 55.9 |
| 9 | 0.135 | 1.13 | 1.56 | 1.75 | 1.83 | 0.999 | 33.0 | 39.0 |
| 10 | 0.143 | 1.00 | 2.16 | 1.78 | 2.07 | 0.995 | 31.6 | 55.3 |
| Avg. | | 1.18 | 1.70 | 1.76 | 1.85 | | | |

| CORE NO. | t | a | $R_m/R_o$ | % Clay | Illite | Smectite* | Chlorite |
|---|---|---|---|---|---|---|---|
| 1 | 2.59 | 0.785 | 3.64 | 2 | xx | — | tr |
| 2 | 2.04 | 0.956 | 21.6 | 1 | xx | x | x |
| 3 | 2.22 | 0.886 | 7.8 | 3 | xx | x | tr |
| 4 | 2.00 | 0.956 | 21.7 | 2 | xx | x | tr |
| 5 | 2.15 | 0.874 | 6.91 | 2 | xx | x | x |
| 6 | 2.50 | 0.826 | 4.75 | 2 | xx | tr | tr |
| 7 | 2.38 | 0.899 | 8.91 | 3 | xx | — | x |
| 8 | 2.56 | 0.764 | 3.25 | 2 | xx | — | tr |
| 9 | 2.29 | 0.846 | 5.49 | 4 | xx | — | tr |

APPENDIX 3
SUMMARY CORE PARAMETERS

| 10 | 2.82 | 0.571 | 1.33 | 3 | xx | — | x |

$t = (F\phi)^1$
xx - most abundant phase
x - phase present in moderate abundance
tr - phase present in trace amounts
*Ca - montmorillonite
**correlation coefficient of CRMM Equations 9 and 12 to data

APPENDIX 4
LIST OF FLOW CHART SYMBOLS

| | |
|---|---|
| R = | resistance |
| Rho = | resistivity |
| I = | resistivity index |
| d = | defines type of input data |
| $n_s$ = | initial value of saturation exponent |
| p = | number of data points |
| $F_m$ = | measured formation factor |
| I(i) = | value of resistivity index at $i^{th}$ partial water saturation |
| $S_w(i)$ = | $i^{th}$ value of partial water saturation |
| $\rho_w$ = | resistivity of water used to saturate core |
| l = | length of core |
| $d_c$ = | diameter of core |
| $R_f(i)$ = | resistance of core at partial water saturation |
| $\rho_f(i)$ = | resistivity of core at partial water saturation |
| $\Delta n$ = | increment by which $n_s$ is changed |
| maxit = | maximum value of iterations allowed if convergence has not been satisfied |
| conv. = | secondary convergence criteria |
| n(j) = | value of $i^{th}$ saturation exponent |

I claim:

1. A method for determining the effective water saturation of a low-resistivity, hydrocarbon-bearing subsurface rock formation, comprising the steps of:
   (a) determining the free-fluid pore network conductance of said low-resistivity rock formation,
   (b) determining the rock matrix conductance of said low-resistivity rock formation, and
   (c) determining the effective water saturation of said low-resistivity rock formation from a taking of the reciprocal of the sum of said free-fluid pore network conductance and said rock matrix conductance.

2. The method of claim 1 wherein steps (a) and (b) are carried out as follows:
   (i) taking a core sample of said subsurface formation,
   (ii) measuring the electrical resistance of said core sample for a plurality of decreasing water saturations,
   (iii) determining from the measured electrical resistance of said core sample said free-fluid pore network conductance, and
   (iv) determining from the measured electrical resistance of said core sample said rock matrix conductance.

3. A method for determining the effective water saturation in a low-resistivity, hydrocarbon-bearing subsurface rock formation, comprising the steps of:
   (a) measuring the electrical resistivity, $\rho_{tm}$, of the formation rock having matrix conductance with an electric log,
   (b) measuring the electrical resistivity, $\rho_w$, of the formation pore water with an electric log or from formation water samples,
   (c) measuring formation porosity ($\phi$) with one or more types of porosity logs, e.g., density, neutron or sonic logs,
   (d) measuring resistivity index (I) vs. water saturation ($S_w$) data from core samples for a plurality of decreasing saturation points,
   (e) determining a parameter (a) and a saturation exponent (n) which relate the identified resistivity index (I) and effective water saturation ($S_w$) by a least squares method of fitting the following relationship to said core resistivity index and water saturation:

$$\frac{1}{I} = aS_w^n + (1 - a),$$

(f) determining a porosity exponent (m) from the formation factor (F) and formation porosity ($\phi$) as follows:

$$m = -(\log(F/a)/\log(\phi)), \text{ and}$$

(g) determining the effective formation water saturation as follows:

$$S_w = \left(\frac{\rho_w}{\rho_{tm}\phi^m} + 1 - \frac{1}{a}\right)^{\frac{1}{n}}.$$

4. A method as in any one of claims 1, 2 or 3 further comprising the step of determining the producible hydrocarbon potential of said low resistivity, subsurface rock formation as follows:

$$S_o = 1 - S_w,$$

where
$S_w$ = effective water saturation, and
$S_o$ = oil saturation, which is representative of said producible hydrocarbon potential.

* * * * *